US007224938B2

(12) United States Patent
Shvodian

(10) Patent No.: US 7,224,938 B2
(45) Date of Patent: May 29, 2007

(54) METHOD OF COMMUNICATING WITH A NETWORK DEVICE

(75) Inventor: William M. Shvodian, McLean, VA (US)

(73) Assignee: Freescale Semiconductor Inc., Austin, TX (US)

(*) Notice: Subject to any disclaimer, the term of this patent is extended or adjusted under 35 U.S.C. 154(b) by 109 days.

(21) Appl. No.: 11/076,855

(22) Filed: Mar. 11, 2005

(65) Prior Publication Data

US 2006/0203837 A1    Sep. 14, 2006

(51) Int. Cl.
*H04B 7/00* (2006.01)
(52) U.S. Cl. .............. 455/41.2; 370/338; 370/340; 709/221; 709/224; 709/245
(58) Field of Classification Search ........... 455/41.2; 370/340, 338; 709/223, 224, 245
See application file for complete search history.

(56) References Cited

U.S. PATENT DOCUMENTS

2004/0166864 A1* 8/2004 Hill et al. ............ 455/450

* cited by examiner

*Primary Examiner*—John Pezzlo
*Assistant Examiner*—Inder Pal Mehra

(57) ABSTRACT

A method is provided for operating a network device (340) in a wireless network (100). This method includes: joining the wireless network; transmitting a probe command (600) after joining the wireless network, the probe command being addressed to a reserved device identifier; listening for an acknowledgement to the probe command from an orphan device (360); sending a management transmission to a network controller (310) requesting the creation of a child network if an acknowledgement to the probe command is received; receiving a controller transmission from the network controller granting permission to create the child network; creating the child network; and allowing an outside device to join the child network.

19 Claims, 6 Drawing Sheets

Another Solution: Have the network device create a child piconet.

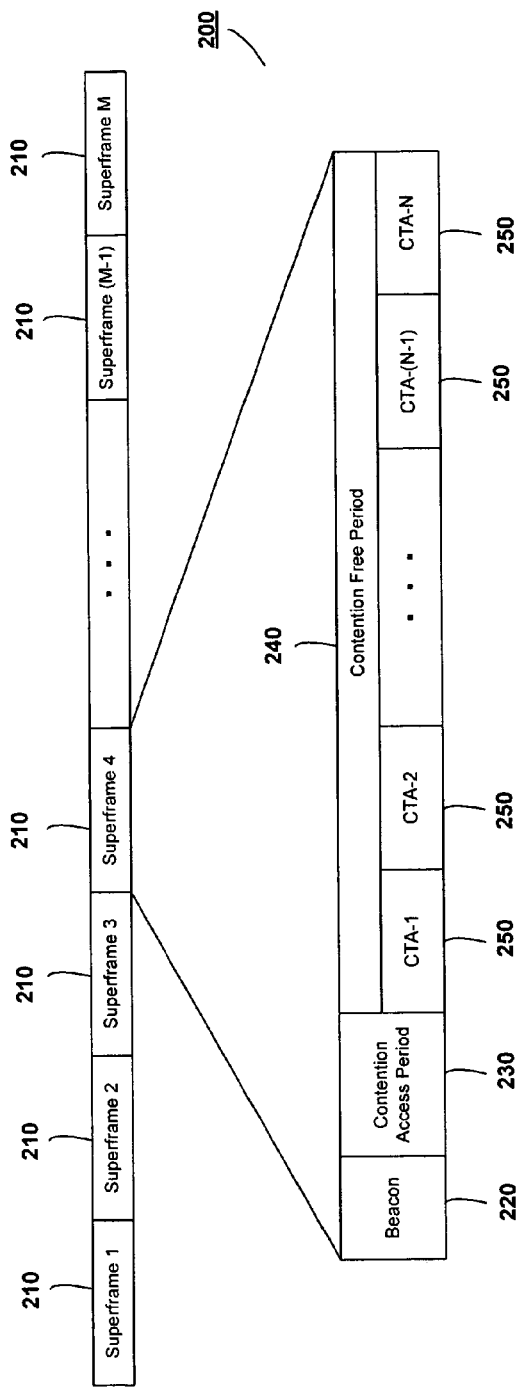
FIG. 2
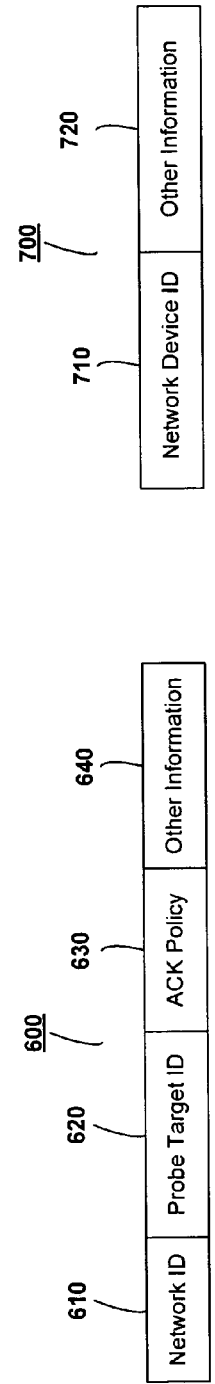
FIG. 7
FIG. 6

Another Solution: Have the network device create a child piconet.

One Solution: Have new device create adjacent piconet on a new channel

Initial Situation with new device

METHOD OF COMMUNICATING WITH A NETWORK DEVICE

FIELD OF THE INVENTION

The present invention relates in general to the operation of a wireless network, and more particularly to a method of allowing a device outside of a network request and facilitate communication with a device inside the network.

BACKGROUND OF THE INVENTION

Some wireless networks are centrally controlled, with a single device coordinating the operation of all of the devices in the network. This central coordinator provides instructions to each of the devices regarding transmission times, power levels, and the like. One example of this sort of network is a piconet using the proposed IEEE 802.15.3 standard.

In such a centrally-controlled network, all of the devices in the network must be able to both send and receive data from the central coordinator. Any device that cannot reliably communicate with the central coordinator of a network cannot join the network.

This means that a local device that can physically communicate reliably with a target device (i.e., it is within operational range of the target device) might not be able to effectively communicate with that target device if the target device is already in a network. In such a case, the local device would have to also be able to communicate with the central coordinator to be assigned the necessary channel time for such a communication.

If the local device can't communicate with the central coordinator, then it won't be able to join the same network that the target device is in to ask to speak to that device. And since the coordinator allocates resources for communication in the network, if the local device is not in the same network as the target device, then the target device will never be assigned any time to communicate with the local device.

In some protocols the target device could create a child network within the main network it belongs to facilitate communication with the local device. In this case the target device would take on the properties of the central coordinator with respect to that child network, and its limits of communication would set the boundaries of the child network. Once the child network was started, the local device could become a member of that child network and request communication with the target device.

However, with current networks, there is no way for the target device to know that there is another device looking to communicate with it. And absent the knowledge that there was another device that would benefit from the creation of a child network, the target device has no reason to start such a child network.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 2 is a block diagram of a TDMA scheme including superframes, according to a disclosed embodiment of the present invention;

FIG. 6 is a block diagram of a probe command according to a disclosed embodiment of the present invention;

FIG. 7 is a block diagram of a child network desired information element according to a disclosed embodiment of the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as an embedded processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Wireless Network

Figure 1:
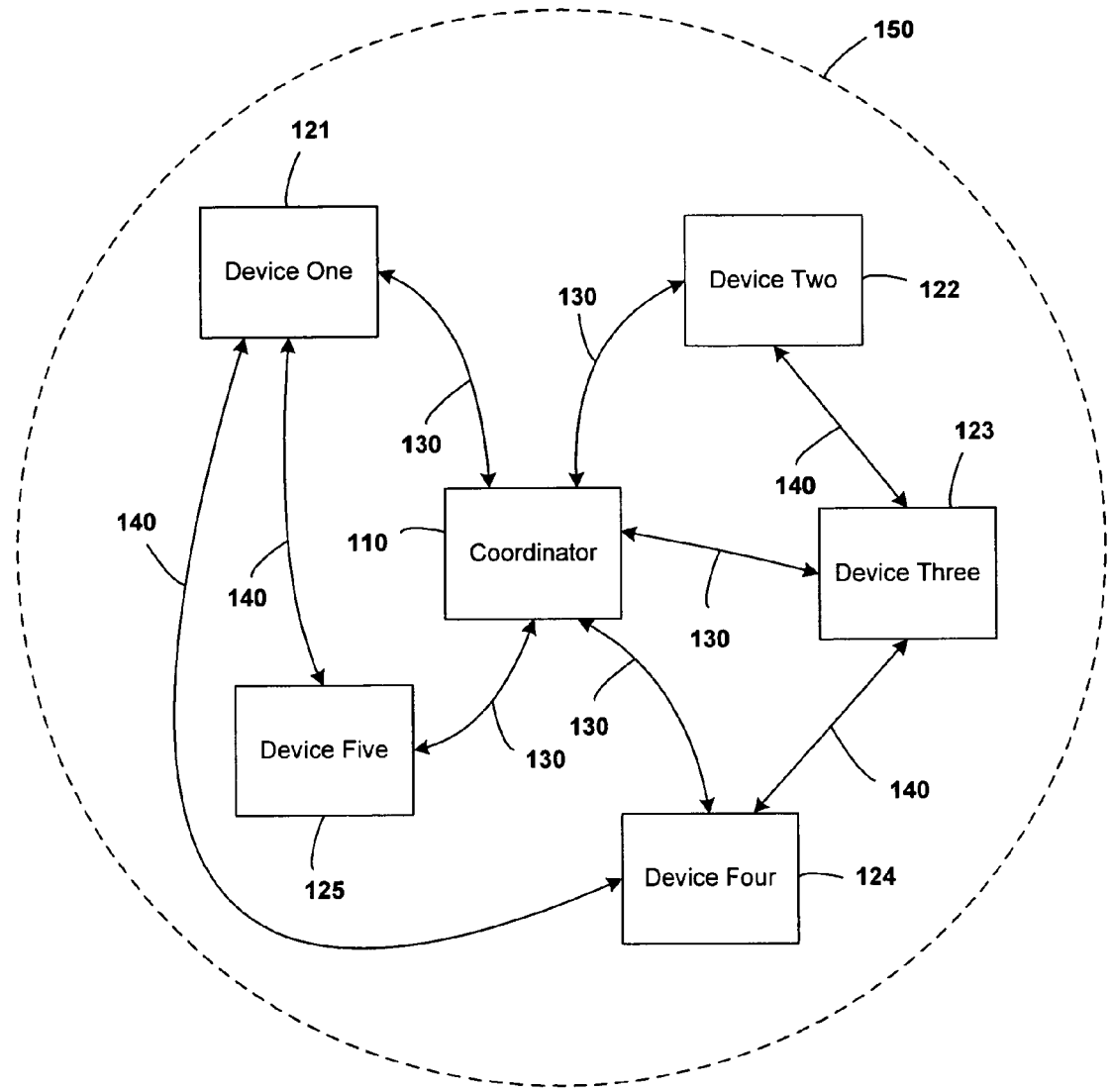
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wired or wireless network.

When the term piconet is used, it refers to a wireless network of devices connected in an ad hoc fashion, having one device act as a coordinator (i.e., it functions as a master) while the other devices (sometimes called stations) follow the time allocation instructions of the coordinator (i.e., they function as slaves). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121–125. The coordinator 110 serves to control the operation of the network 100. As noted above, the system of coordinator 110 and devices 121–125 may be called a piconet, in which case the coordinator 110 may be referred to as a piconet coordinator (PNC). Each of the non-coordinator devices 121–125 must be connected to the coordinator 110 via primary wireless links 130, and may also be connected to one or more other non-coordinator devices 121–125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121–125, except with the additional functionality for coordinating the system, and the requirement that it communicates with every device 121–125 in the network 100. In other embodiments the coordinator 110 may be a separate designated control unit that does not function as one of the devices 121–125.

In some embodiments the coordinator 110 will be a device just like the non-coordinator devices 121–125. In other embodiments the coordinator 110 could be a separate device dedicated to that function. Furthermore, individual non-coordinator devices 121–125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, a laptop personal computer, a desktop personal computer, or other personal wireless device.

The various non-coordinator devices 121–125 are confined to a usable physical area 150, which is set based on the extent to which the coordinator 110 can successfully communicate with each of the non-coordinator devices 121–125. Any non-coordinator device 121–125 that is able to communicate with the coordinator 110 (and vice versa) is within the usable area 150 of the network 100. As noted, however, it is not necessary for every non-coordinator device 121–125 in the network 100 to communicate with every other non-coordinator device 121–125.

Although a wireless network is described with reference to FIG. 1, and the disclosure refers to this wireless network by way of example, the current claimed invention is equally applicable to wired networks. By way of example the present claimed invention could be applied to wireless networks of the sort defined by the IEEE 802.11 standard or the IEEE 803.15.3 standard, the proposed IEEE 802.15.3b standard, by a wired Ethernet network, or to any other suitable wired or wireless network.

Superframes

The available bandwidth in a given network 100 may be split up in time by the coordinator 110 into a series of repeated superframes. These superframes define how the available transmission time is split up among various tasks. Individual frames of data are then transferred within these superframes in accordance with the timing set forth in the superframe.

FIG. 2 is a block diagram of a TDMA scheme including superframes and channel time allocations according to a disclosed embodiment of the present invention. As shown in FIG. 2, the available transmission time 200 is broken up into a plurality of consecutive superframes 210. Each individual superframe 210 in this embodiment includes a beacon period 220, a contention access period (CAP) 230, and a contention free period (CFP) 240. The contention free period 340 is further broken up into a plurality of channel time allocations (CTAs) 250 (also called time slots).

The beacon period 220 is set aside for the coordinator 110 to send a beacon frame out to the non-coordinator devices 121–125 in the network 100. Such a beacon frame will include information for organizing the operation of devices within the superframe 210. Each non-coordinator device 121–125 knows how to recognize a beacon period 220 prior to joining the network 100, and uses the beacon 220 both to identify an existing network 100 and to coordinate communication within the network 100.

The beacon frame provides information required by the devices 121–125 in the network 100 regarding how the individual channel time allocations 250 will be allocated. In particular, it notes how and when devices 110, 121–125 can transmit to prevent any two devices from interfering.

The CAP 230 is used to transmit commands or asynchronous data across the network 100. The CAP 230 may be eliminated in many embodiments and the system would then pass commands solely during the CFP 240.

The CFP 240 includes a plurality of channel time allocations 250. These channel time allocations 250 are each assigned by the coordinator 110 to one or more transmitting devices 110, 121–125 and one or more receiving devices 110, 121–125 for transmission of information between them. Generally each transmitting device will have a single associated receiver, through in some cases a single transmitter will transmit to multiple receivers at the same time.

The channel time allocations 250 are provided to allow communication between devices 120, 121–125. They do so in accordance with the information set forth in the beacon 220. The size of the channel time allocations 250 can vary by embodiment, but it should be large enough to transmit one or more data frames.

Although the embodiments described in this document are in the context of a WPAN (or piconet), it should be understood that the present invention also applies to other settings where bandwidth is to be shared among several users, such as, for example, wireless local area networks (WLAN), other appropriate wireless network, or any wired or wireless transmission scheme in which bandwidth must be shared.

The superframes 210 are fixed time constructs that are repeated in time. The specific duration of the superframe 210 is described in the beacon 220. In fact, the beacon 220 generally includes information regarding how often the beacon 220 is repeated, which effectively corresponds to the duration of the superframe 210. The beacon 220 also contains information regarding the network 100, such as the identity of the transmitters and receivers assigned to each channel time allocation 250, the necessary transmission parameters for signals within a channel time allocation 250, and the identity of the coordinator 110.

The system clock for the network 100 is preferably synchronized through the generation and reception of the beacons 220. Each non-coordinator device 121–125 will store a synchronization point time upon successful reception of a valid beacon 220, and will then use this synchronization point time to adjust its own timing.

Communication with an Orphan Device

As noted above, every non-coordinator device 121–125 in a network 100 must be able to communicate with the network coordinator 110. Devices outside the usable area 150 of the network 100 (i.e., outside the communication range of the network coordinator 110) cannot join the network 100. Unfortunately this means that even if a device outside the usable area 150 of the network 100 is within communication range of its target device, it can't request communication time with the target device. A remote device in such a situation can be referred to as an orphan device.

Figure 3:
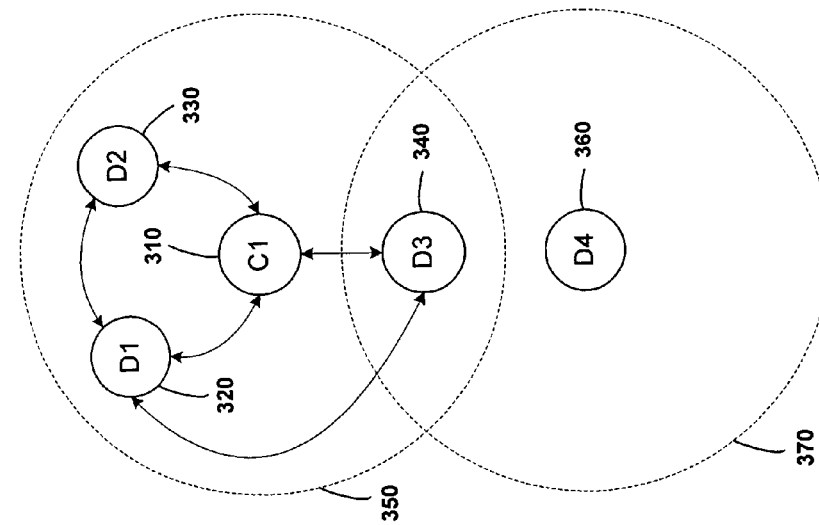
FIG. 3 is a block diagram of a wireless network and adjacent orphan device according to a disclosed embodiment of the present invention.

FIG. 3 is a block diagram of a wireless network and adjacent orphan device according to a disclosed embodiment of the present invention. As shown in FIG. 3, the disclosed environment includes a first network coordinator 310, a first non-coordinator device 320, a second non-coordinator device 330, a third non-coordinator device 340, and a fourth orphan device 360. For ease of description, the first network coordinator 310 will be referred to as the first coordinator 310, the first through third non-coordinator devices 320–340 will be referred to as the first through third devices 320–340, and the fourth orphan device 360 will be referred to as the orphan device 360.

The first coordinator 310 and the first through third devices 320–340 form a first network under the control of the first coordinator 310. This network has a first usable area defined by a first communication limit 350 of the first coordinator 310.

The first coordinator 310 provides instructions for the operation of the first though fourth devices 320–340, and receives various management information from the first though fourth devices 320–340. As a result, each of these devices must operate within the first communication limit 350.

The orphan device 360 has a second communication limit 370 that represents the limits of its own communication capability. In this disclosed embodiment the orphan device 360 is located outside of the first communication limit 350 and the first coordinator 310 is located outside of the second communication limit 370. As a result, neither can communicate with the other, and so the orphan device 360 cannot join the first network.

However, in this disclosed embodiment the third non-coordinator device 340 is located within the second communication limit 370. As a result, the third non-coordinator device 340 and the orphan device 460 are physically capable of communication with each other. But before such communication can occur, the two must both join the same network and have the coordinator of that new network provide the parameters of such communication. Since the disclosed protocol is one with centralized control, the only way devices can pass data is as directed by a network coordinator.

Figure 5:
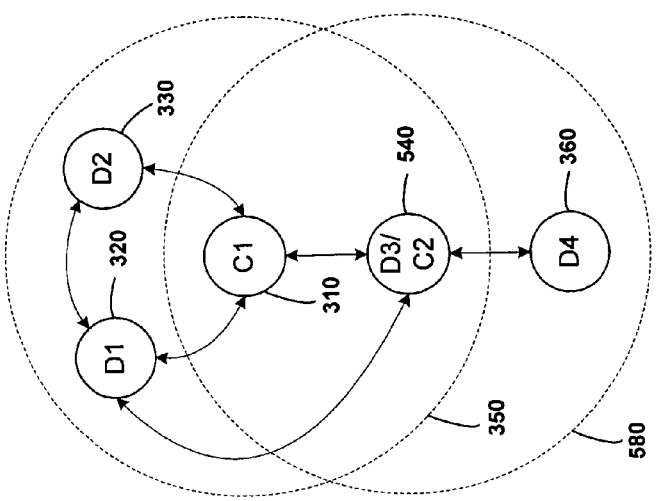
FIG. 5 is a block diagram of a wireless network including a child wireless network according to a disclosed embodiment of the present invention.

Thus, if the fourth device 360 wants to communicate with the third device 340, it has two main options: it can create its own network and invite the third device 340 to join; or it can convince the third device 340 to create a child network within the first network and then invite the fourth device 360 to join. Examples of these two options are shown in FIGS. 4 and 5.

Figure 4:
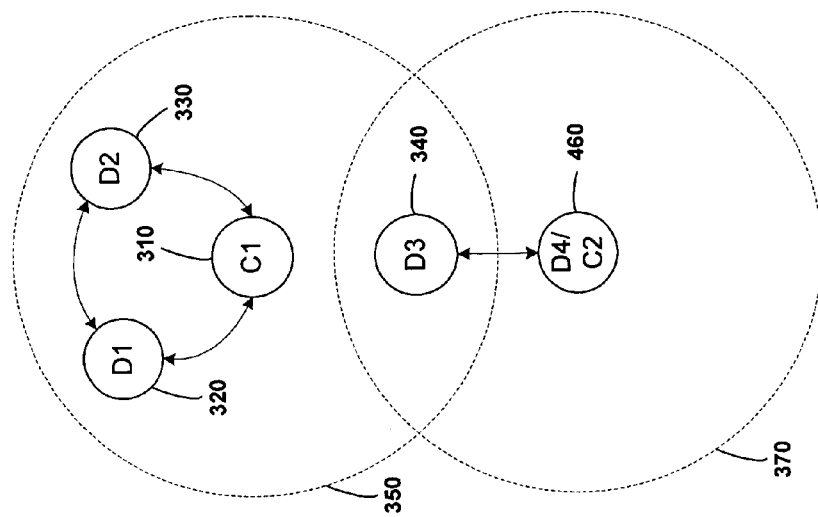
FIG. 4 is a block diagram of a wireless network and a neighbor wireless network according to a disclosed embodiment of the present invention.

FIG. 4 is a block diagram of a wireless network and a neighbor wireless network according to a disclosed embodiment of the present invention. As shown in FIG. 4, the disclosed environment includes a first coordinator 310, first through third devices 320–340, and a second network coordinator 460.

The first coordinator 310 and the first through third devices 320–340 operate just as they were disclosed above with respect to FIG. 3. However in this embodiment, the orphan device 360 takes on the role of the second coordinator 460, and creates a second network using a different channel The second coordinator 460 can then communicate with the third device 340 via the beacon in the second network, either inviting the third device 340 to join the second network, or requesting that the third device set up a child network and invite the second coordinator 460 (i.e., the orphan device 360) to join.

Because the first coordinator 310 and the second coordinator 460 cannot communicate with each other, the first and second network must operate on different channels to avoid interference with each other. Although a mechanism of neighboring networks may exist, allowing adjacent networks to share a single channel, such a structure would require the two network coordinators 310 and 460 to be able to pass data to arrange the sharing of the channel.

Furthermore, because no device can be under the primary control of two coordinators at the same time, if the third device 340 joined the second network, it would have to leave the first network to do so. However, the third device 340 could listen to the beacon in the second network during a channel scan without leaving the first network.

FIG. 5 is a block diagram of a wireless network including a child wireless network according to a disclosed embodiment of the present invention. As shown in FIG. 5, the disclosed environment includes a first coordinator 310, first and second devices 320 and 330, a third coordinator 540, and an orphan device 360.

The first coordinator 310, the first and second devices 320 and 330, and the orphan device 360 operate just as they were disclosed above with respect to FIG. 3. However in this embodiment, the third device 340 takes on the role of the third coordinator 540, and creates a child network within the first network. In this case the third coordinator 540 has a third communication limit 380 that represents the limits of its own communication capability.

The child network operates under the ultimate control of the first coordinator 310, granting the child network a portion of channel time in the first network. The third coordinator 540 can then run that allocated channel time as it sees fit. Since the orphan device 360 is within the third communication limit 380 of the third coordinator 540 (and the third coordinator 540 is presumably within a communication limit of the orphan device 360), the third coordinator 540 can invite the orphan device 360 to join the child network, allowing the third coordinator 540 (i.e., the third device 340) and the orphan device 360 to communicate.

What is necessary, however, in either of these embodiments is for the third device 340 to recognize the presence of the orphan device 360 and its desire to communicate. This can be accomplished in a number of ways, two of which are described by way of example.

First, the third device 340 could periodically send out a probe command looking for orphan devices. This probe command can be addressed to set device address that will ensure that devices in the network and devices outside of the network that can hear the network coordinator will not respond. And unlike a typical probe command, this can be sent with an immediate acknowledgement policy. Second, the orphan device 360 could form a second network as a second coordinator 460, and send out a request in its beacon for the third device 340 to form a child network (e.g., it could send a child network desired information element in its beacon).

FIG. 6 is a block diagram of a probe command according to a disclosed embodiment of the present invention. As shown in FIG. 6, the probe command 600 includes a network identifier 610, a probe target identifier 620, an acknowledgement (ACK) policy indicator 630, and other information 620.

The network identifier 610 provides the network identifier of the network for which the device transmitting the probe command 600 belongs. Although this information will not necessarily be if use to an orphan device responding to the probe command 600, it is useful in preventing devices that can contact the network coordinator (and thus are not properly orphan devices) from responding.

The probe target identifier 620 provides the device identifier for the device or group of devices that the probe command is targeted at. In the disclosed embodiment the probe target identifier 620 uses a device identifier that is used to represent unassigned devices.

The ACK policy indicator 620 indicates what the acknowledgement policy of the command should be. This can include no-acknowledgment, immediate-acknowledgement, or delayed-acknowledgment. In this situation, the probe command uses an immediate-acknowledgement policy, allowing orphan devices to respond to the probe. In alternate embodiments in which multiple orphan devices are expected, a slotted Aloha or a carrier sense multiple access with collision avoidance (CSMA/CA) system of acknowledgement could be used to avoid acknowledgement collisions.

The other information 630 can include an indicator of the command type, an indicator of the length of the probe command 600, or anything else that the network requires. In particular, the probe command can include a header identifying the source device for the transmission.

When a probe command is sent out to the unassigned address using an immediate acknowledgement policy, only devices that are both unassigned (i.e., not in the network) and cannot hear the beacon associated with the network identifier 610 (i.e., they are out of the usable area of the network) may respond. These are the orphan devices that might desire to communicate with the device, but cannot join the network because they cannot hear the network coordinator.

If a device that sends out a probe command 600 receives an immediate acknowledgement to that command, it will know that there is an orphan device nearby that wishes to communicate and can request that its network coordinator allow it to form a child network. Once the child network is formed, the orphan device can associate with the child network and communication can commence.

FIG. 7 is a block diagram of a child network desired information element according to a disclosed embodiment of the present invention. As shown in FIG. 7, the child network desired information element includes a network device identifier 710 and other information 730.

The network device identifier 710 provides the device identifier for one or more devices that the orphan device would like to communicate with.

The other information 720 can include an element identifier, an indicator of the length of the child network desired information element 700, or anything else that the network requires.

As noted above, when an orphan device desires to communicate with a network device, it can create its own network on a different channel from the adjacent network, and send out a child network desired information element 700 in its beacon. Although the network device (or devices) will not hear this beacon normally, it will periodically perform a channel scan to locate adjacent networks. During such a scan, the network device will find the new network, hear its beacon, and receive the child network desired information element 700. The network device will then know that there is an orphan device nearby that wishes to communicate and can request that its network coordinator allow it to form a child network. Once the child network is formed, the orphan device can end its own network and associate with the child network so that communication can commence.

Operation of a Device in a Network Using a Probe Command

Figure 8:
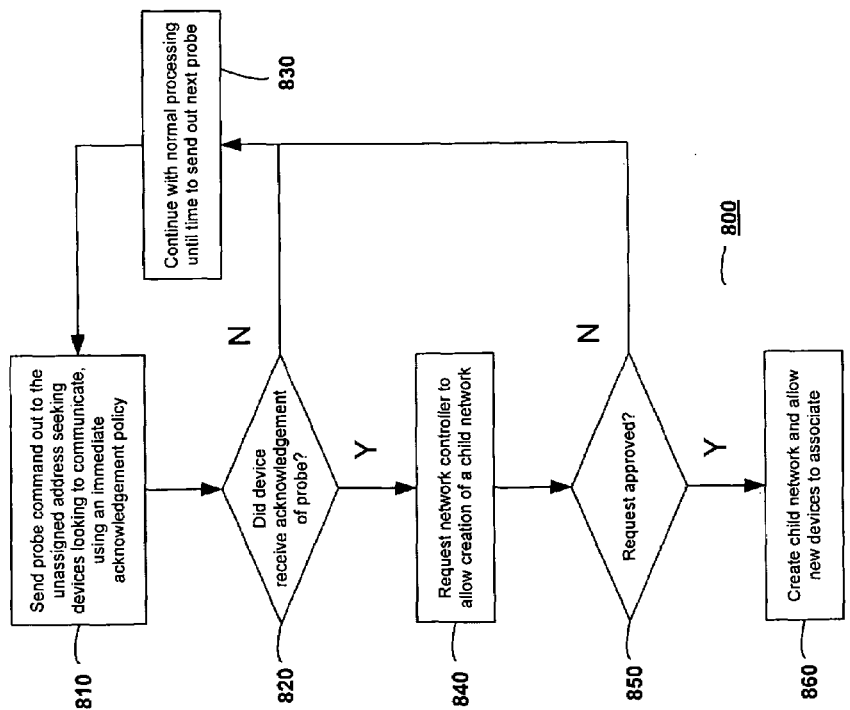
FIG. 8 is a flow chart of the operation of a network device using a probe command according to a disclosed embodiment of the present invention.

FIG. 8 is a flow chart of the operation of a network device using a probe command according to a disclosed embodiment of the present invention.

As shown in FIG. 8, the operation 800 starts when the network device sends a probe command 600 to the unassigned address seeking for devices looking to communicate. (810) This probe command 600 will be sent using an immediate-acknowledgment policy.

The network device will then determine whether it has received an acknowledgement to the probe command within an allowable time. (820)

If no acknowledgement is received, the network device will assume that there are no adjacent orphan devices desiring communication and will continue with normal processing until it is time to send out the next probe command (830), at which time the operation 800 will begin again by sending a probe command. (810) The frequency of the transmission of the probe command can vary as needed by the network. Greater frequency will cost more in overhead, but will allow orphan devices to be identified sooner, while lower frequency will cost less in overhead, but will increase the chance that orphan devices will have to wait before they can communicate.

If the network device did receive an acknowledgment to its probe command then it knows that there is an adjacent orphan device that desires to communicate with it. It can then request the network controller to allow it to create a child network. (840)

Then the network device must determine if its request is approved. (850) If the request is not approved, it will continue with normal processing until it is time to send out the next probe command (830), at which time the operation

800 will begin again. (810) If the request is approved, the network device will create a child network and allow new devices to associate. (860) Since the orphan device must be able to communicate with the network device (else it never would have received the probe command, nor would the network device have received the acknowledgement), it should have no trouble associating with the child network and communication can begin.

In particular, a disclosed method of operating a network device in a wireless network may include: joining the wireless network; transmitting a probe command after joining the wireless network, the probe command being addressed to a reserved device identifier; listening for an acknowledgement to the probe command from an orphan device; and sending a management transmission to a network controller requesting the creation of a child network if an acknowledgement to the probe command is received.

The method may further comprise: receiving a controller transmission from the network controller granting permission to create the child network; creating the child network; and allowing an outside device to join the child network.

The probe command may use one of: an immediate acknowledgement policy a slotted Aloha acknowledgement policy, and a carrier sense multiple access with collision avoidance acknowledgement policy. The reserved device identifier may be an unassigned device identifier that specifically references devices that have not been assigned individual device identifiers.

The network device may periodically repeat the transmitting of the probe command and the listening for an acknowledgement to the probe command. In particular, the network device may transmit the probe command in one of: a regularly-scheduled channel time allocation assigned to the network device; a management channel time allocation assigned to the network device; a specifically-requested channel time allocation assigned to the network device; and a contention access period.

The method may be implemented in an ultra wideband device. The method may also be implemented in an integrated circuit.

Operation of an Orphan Device Receiving a Probe Command

Figure 9:
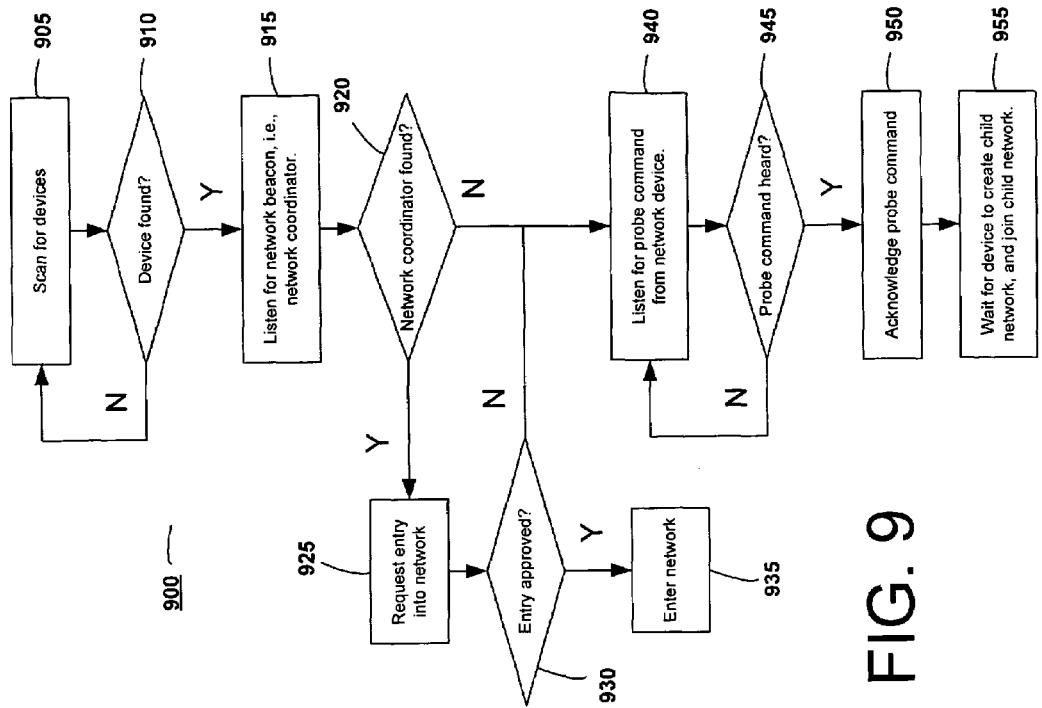
FIG. 9 is a flow chart of the operation of an orphan device receiving a probe command according to a disclosed embodiment of the present invention.

FIG. 9 is a flow chart of the operation of an orphan device receiving a probe command according to a disclosed embodiment of the present invention.

As shown in FIG. 9, the operation 900 starts when the orphan device scans for nearby devices (905) and determines whether any devices are found. (910)

If no devices are found, the orphan device continues scanning (905), though after some period of time it may determine that there are no nearby devices and may shut down, switch channels, start a new network, or take other action as appropriate.

If a device is found, the orphan device will listen for a network beacon to see if it can hear the network coordinator (915) and thus determine whether a network coordinator has been found. (920)

If a network coordinator is found, the orphan device will request entry into the network using an association process. (925) It will wait to determine if its entry is approved (930), and if so, will enter the network (935). Once in the network, it will be able to request communication with the identified device through the network coordinator.

If either no network controller is found (920) or entry into the network is not approved (930), the orphan device will determine that either it cannot hear the network coordinator or the network coordinator cannot hear it. The orphan device will then listen for probe commands from the identified network device that use an immediate-acknowledgement policy (940), continually determining whether any such probe commands are heard. (945)

If no such probe commands are heard, the orphan device continues listening (940), though after some period of time it may determine that no probe command will be forthcoming and may shut down, switch channels, start a new network, or take other action as appropriate.

If a probe command from the desired device with an immediate acknowledgement policy is heard, the orphan device will then acknowledge that probe command (950) to let the transmitting device know that the orphan device Then the orphan device will wait for the network device to create a child network, and when the child network is created will take what steps are necessary to join the child network. (955) Since the orphan device must be able to communicate with the network device (else it never would have received the probe command, nor would the network device have received the acknowledgement), it should have no trouble associating with the child network and communication can begin.

In particular, a disclosed of operating an orphan device may include: scanning a wireless channel for operating network devices; listening for a network beacon on the wireless channel if the scan identifies an operating network device on the wireless channel; receiving a probe command from the operating network device; acknowledging the probe command to the operating network device if no network beacon has been received; listening for an invitation from the operating network device to join a child network; and joining the child network, The probe command may be addressed to a reserved device identifier. The reserved device identifier may be an unassigned device identifier that specifically references devices that have not been assigned individual device identifiers.

The method may be implemented in an ultra wideband device. The method may also be implemented in an integrated circuit.

Operation of an Orphan Device Using an Adjacent Network

Figure 10:
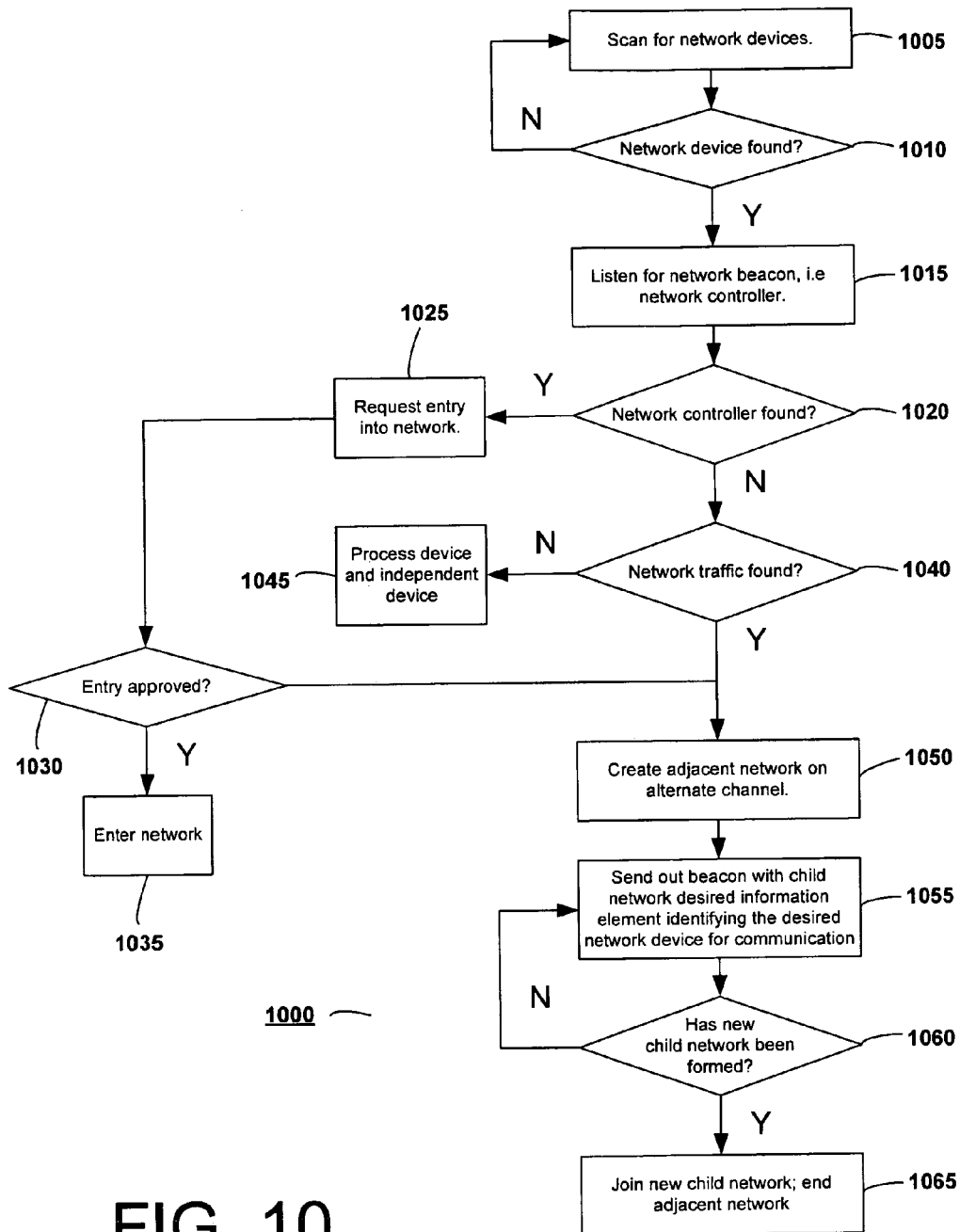
FIG. 10 is a flow chart of the operation of an orphan device using an adjacent network according to a disclosed embodiment of the present invention.

FIG. 10 is a flow chart of the operation of an orphan device using an adjacent network according to a disclosed embodiment of the present invention.

As shown in FIG. 10, the operation 1000 starts when the orphan device scans for nearby devices (1005) and determines whether any devices are found. (1010)

If no devices are found, the orphan device continues scanning (1005), though after some period of time it may determine that there are no nearby devices and may shut down, switch channels, start its own network, or take other action as appropriate.

If a device is found, the orphan device will listen for a network beacon to see if it can hear the network coordinator (1015) and thus determine whether a network coordinator has been found. (1020)

If a network coordinator is found, the orphan device will request entry into the network using an association process. (1025) It will wait to determine if its entry is approved (1030), and if so, will enter the network (1035). Once in the network, it will be able to request communication with the identified device through the network coordinator.

If no network controller is found, the orphan device will listen for the transmission of other network frames not sent by a network coordinator. (1040)

If no network traffic is found, the orphan device will consider that the identified device is an independent device, not a network device, and will process accordingly. (1045)

If either no network traffic is found (1040) or entry into the network is not approved (1030), the orphan device will determine that either it cannot hear the network coordinator or the network coordinator cannot hear it. The orphan device will then create its own network on an alternate channel (1050) and begin sending out a beacon with a child network desired information element 700 included that identifies the network device with which communication is desired. (1055)

The orphan device (now coordinator in its own network) determines whether a new network has been formed adjacent to it, e.g., by performing a channel scan. (1060) If no new network has been formed devices are found, the orphan device continues scanning for new networks (1060), though after some period of time it may determine that there are no nearby devices and may shut down, switch channels, change its power level, or take other action as appropriate.

If, however, it discovers that a child network has been created, it will end its adjacent network, and take what steps are necessary to join the child network. (1065) Since the orphan device must be able to communicate with the network device (else it never would have received the probe command, nor would the network device have received the acknowledgement), it should have no trouble associating with the child network and communication can begin.

In particular, a disclosed method of operating an orphan device may include: scanning a wireless channel for operating network devices; listening for an operating network beacon on the wireless channel if the scan identifies an operating network device on the wireless channel; creating a local network with the orphan device as a local network controller, if the orphan device does not hear an operating network beacon; sending a local network beacon including a request to create a child network; listening for an invitation from the operating network device to join a child network; and ending the local network and joining the child network if an invitation to join the child network is received from the operating network device.

The local network beacon may include an operating device identifier for the operating network device. The local network beacon may also include a plurality of operating device identifiers for a plurality of operating network devices identified by the orphan device as operating on the wireless channel. The local network beacon may also include a child network identifier for the child network.

The method may be implemented in an ultra wideband device. The method may also be implemented in an integrated circuit.

Operation of a Device in a First Network Scanning an Adjacent Network

Figure 11:
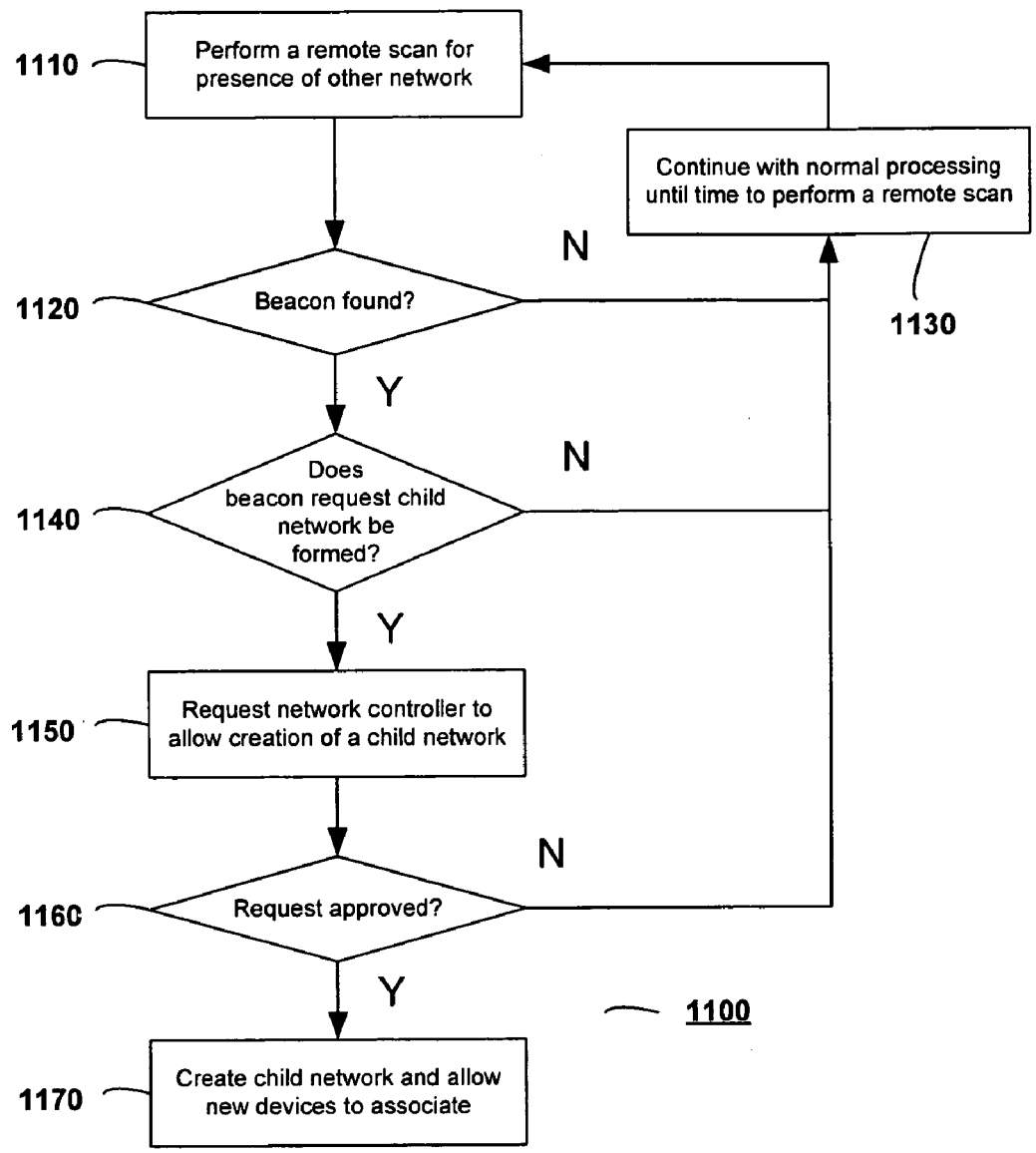
FIG. 11 is a flow chart of the operation of a network device in a first network scanning an adjacent network according to a disclosed embodiment of the present invention.

FIG. 11 is a flow chart of the operation of a network device in a first network scanning an adjacent network according to a disclosed embodiment of the present invention.

As shown in FIG. 11, the operation 1100 begins when the network device performs a remote scan to scan available channels for the presence of other networks (1110) and determines whether any network beacons have been found (indicating the presence of an adjacent network) (1120)

If the scan discovers no beacons, the network device will assume that there are no adjacent networks and will continue with normal processing until it is time to perform the next channel scan (1130), at which time the network will repeat the channel scan. (1110) The frequency of the channel scan can vary as needed by the network. Greater frequency will cost more in overhead, but will adjacent networks to be identified sooner, while lower frequency will cost less in overhead, but will increase the chance that networks created by orphan devices will remain undiscovered for longer periods of time.

If a beacon is found, however, the network device will determine if the beacon contains a child network desired information element indicating that the coordinator of the adjacent network wishes to request that the network device form a child network. (1140)

If the network device does not find a child network desired information element in the beacon identifying it by device identifier, it will assume that the coordinator of the adjacent network does not wish it to create a child network and will continue with normal processing until it is time to perform the next channel scan (1130), at which time the network will repeat the channel scan. (1110)

If, however, the network device does not find a child network desired information element in the beacon identifying it by device identifier, it will know that there is an adjacent orphan device (currently serving as the coordinator of the adjacent network) that desires to communicate with it. The network device can then request the network controller to allow it to create a child network. (1150)

Then the network device must determine if its request is approved. (1160) If the request is not approved, the network device will continue with normal processing until it is time to perform the next channel scan (1130), at which time the network will repeat the channel scan. (1110)

If the request is approved, the network device will create a child network and allow new devices to associate. (1170) Since the orphan device must be able to communicate with the network device (else it never would have identified the network device sufficiently to identify it by device identifier in the child network desired information element, nor would the network device have received the beacon containing the child network desired information element), it should have no trouble associating with the child network and communication can begin.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of operating a network device in a wireless network, comprising:
   joining the wireless network;
   transmitting a probe command after joining the wireless network, the probe command being addressed to a reserved device identifier;
   listening for an acknowledgement to the probe command from an orphan device; and
   sending a management transmission to a network controller requesting the creation of a child network if an acknowledgement to the probe command is received.

2. A method of operating a network device in a wireless network, as recited in claim 1, further comprising:
   receiving a controller transmission from the network controller granting permission to create the child network;
   creating the child network; and
   allowing an outside device to join the child network.

3. A method of operating a network device in a wireless network, as recited in claim 1, wherein the probe command uses one of: an immediate acknowledgement policy a slotted Aloha acknowledgement policy, and a carrier sense multiple access with collision avoidance acknowledgement policy.

4. A method of operating a network device in a wireless network, as recited in claim 1, wherein the reserved device identifier is an unassigned device identifier that specifically references devices that have not been assigned individual device identifiers.

5. A method of operating a network device in a wireless network, as recited in claim 1, wherein the network device periodically repeats the transmitting of the probe command and the listening for an acknowledgement to the probe command.

6. A method of operating a network device in a wireless network, as recited in claim 1, wherein the network device transmits the probe command in one of: a regularly-scheduled channel time allocation assigned to the network device; a management channel time allocation assigned to the network device; a specifically-requested channel time allocation assigned to the network device; and a contention access period.

7. A method of operating a network device in a wireless network, as recited in claim 1, wherein the method is implemented in an ultra wideband device.

8. A method of operating a network device in a wireless network, as recited in claim 1, wherein the method is implemented in an integrated circuit.

9. A method of operating an orphan device, comprising:
   scanning a wireless channel for operating network devices;
   listening for a network beacon on the wireless channel if the scan identifies an operating network device on the wireless channel;
   receiving a probe command from the operating network device;
   acknowledging the probe command to the operating network device if no network beacon has been received;
   listening for an invitation from the operating network device to join a child network; and
   joining the child network.

10. A method of operating an orphan device, as recited in claim 9, wherein the probe command is addressed to a reserved device identifier.

11. A method of operating an orphan device, as recited in claim 10, wherein the reserved device identifier is an unassigned device identifier that specifically references devices that have not been assigned individual device identifiers.

12. A method of operating an orphan device, as recited in claim 9, wherein the method is implemented in an ultra wideband device.

13. A method of operating an orphan device, as recited in claim 9, wherein the method is implemented in an integrated circuit.

14. A method of operating an orphan device, comprising:
   scanning a wireless channel for operating network devices;
   listening for an operating network beacon on the wireless channel if the scan identifies an operating network device on the wireless channel;
   creating a local network with the orphan device as a local network controller, if the orphan device does not hear an operating network beacon;
   sending a local network beacon including a request to create a child network;
   listening for an invitation from the operating network device to join a child network; and
   ending the local network and joining the child network if an invitation to join the child network is received from the operating network device.

15. A method of operating an orphan device, as recited in claim 14, wherein the local network beacon includes an operating device identifier for the operating network device.

16. A method of operating an orphan device, as recited in claim 14, wherein the local network beacon includes a plurality of operating device identifiers for a plurality of operating network devices identified by the orphan device as operating on the wireless channel.

17. A method of operating an orphan device, as recited in claim 14, wherein the local network beacon includes a child network identifier for the child network.

18. A method of operating an orphan device, as recited in claim 14, wherein the method is implemented in an ultra wideband device.

19. A method of operating an orphan device, as recited in claim 14, wherein the method is implemented in an integrated circuit.

* * * * *